United States Patent
Jeong

(10) Patent No.: US 12,415,582 B2
(45) Date of Patent: Sep. 16, 2025

(54) APPARATUS AND METHOD FOR AUTOMATIC ASSEMBLY OF BRAKE SYSTEM

(71) Applicants: Hyundai Motor Company, Seoul (KR); Kia Corporation, Seoul (KR)

(72) Inventor: Dong Ha Jeong, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/838,048

(22) PCT Filed: Dec. 20, 2022

(86) PCT No.: PCT/KR2022/020783
§ 371 (c)(1),
(2) Date: Aug. 13, 2024

(87) PCT Pub. No.: WO2023/171892
PCT Pub. Date: Sep. 14, 2023

(65) Prior Publication Data
US 2025/0145238 A1  May 8, 2025

(30) Foreign Application Priority Data
Mar. 7, 2022  (KR) .................. 10-2022-0028476

(51) Int. Cl.
*B62D 65/12* (2006.01)
*B23P 21/00* (2006.01)
(Continued)

(52) U.S. Cl.
CPC ............ *B62D 65/12* (2013.01); *B23P 21/002* (2013.01); *B25J 11/005* (2013.01); *B25J 13/085* (2013.01);
(Continued)

(58) Field of Classification Search
CPC ...... B62D 65/12; B62D 65/028; B25J 11/005; B25J 13/085; B25J 15/0052;
(Continued)

(56) References Cited

U.S. PATENT DOCUMENTS 11,845,490 B1 * 12/2023 Shroyer ................. B62D 17/00
2010/0057256 A1 * 3/2010 Sato ....................... B25J 13/085
700/258
(Continued)

FOREIGN PATENT DOCUMENTS

CN      104385040 A  *  3/2015  ............. B23Q 7/043
JP       58036777 A  *  3/1983  ............. B62D 65/12
(Continued)

OTHER PUBLICATIONS

Machine Translation of CN 104385040 A1 (Year: 2015).*
(Continued)

*Primary Examiner* — Jermie E Cozart
(74) *Attorney, Agent, or Firm* — Morgan, Lewis & Bockius LLP

(57) ABSTRACT

Proposed are an apparatus and a method for automatic assembly of a brake system, wherein the work of coupling a clevis pin (300) and a snap pin (400) to connect a pedal arm (110) of a brake pedal (100) to a clevis (220) provided on a push rod (210) of a brake (200) is automated, thereby contributing to work efficiency improvement and quality enhancement.

15 Claims, 12 Drawing Sheets

(51) Int. Cl.
  *B25J 11/00* (2006.01)
  *B25J 13/08* (2006.01)
  *B25J 15/00* (2006.01)
  *B62D 65/02* (2006.01)
  *B25J 15/06* (2006.01)
  *B25J 19/02* (2006.01)
(52) U.S. Cl.
  CPC ........ *B25J 15/0052* (2013.01); *B62D 65/024* (2013.01); *B25J 13/086* (2013.01); *B25J 15/0608* (2013.01); *B25J 19/023* (2013.01); *B62D 65/028* (2013.01)
(58) Field of Classification Search
  CPC .. B25J 15/0061; B25J 15/0608; B25J 19/023; B25J 19/105; B25J 19/12; B23P 21/002
  See application file for complete search history.

(56) References Cited

U.S. PATENT DOCUMENTS

| | | | | |
|---|---|---|---|---|
| 2010/0298978 | A1* | 11/2010 | Tani | B25J 19/023 901/47 |
| 2012/0246938 | A1* | 10/2012 | Beck | B23P 19/12 29/281.1 |
| 2015/0274142 | A1 | 10/2015 | Ishizuki et al. | |
| 2016/0325438 | A1* | 11/2016 | Li | B25J 15/0616 |
| 2016/0339590 | A1* | 11/2016 | Lin | B25J 15/0408 |
| 2021/0387331 | A1* | 12/2021 | Wong | B25J 15/103 |
| 2022/0097185 | A1* | 3/2022 | Czinger | G05B 19/41805 |
| 2022/0126446 | A1* | 4/2022 | Chen | G06V 20/10 |

FOREIGN PATENT DOCUMENTS

| | | | | |
|---|---|---|---|---|
| JP | 8-142947 A | 6/1996 | | |
| KR | 10-2009-0057637 A | 6/2009 | | |
| KR | 10-2012-0047155 A | 5/2012 | | |
| KR | 10-1405055 B1 | 6/2014 | | |
| WO | WO-2017033355 A1 * | 3/2017 | ............ | A61B 34/32 |
| WO | WO-2017033359 A1 * | 3/2017 | ............ | A61B 34/32 |

OTHER PUBLICATIONS

Reko International Group Inc. Reko Pedal Assembly Line. Youtube [Online]. Jun. 17, 2021. [Retrieved on Mar. 6, 2023]. Retrieved from <URL: https://www.youtube.com/watch?v=53nuqdeh1co>. See reproduction time 0:00-0:45.

International Search Report (with partial translation) and Written Opinion issued in corresponding International Patent Application No. PCT/KR2022/020783, dated Mar. 24, 2023.

\* cited by examiner

APPARATUS AND METHOD FOR AUTOMATIC ASSEMBLY OF BRAKE SYSTEM

This application is the U.S. National Phase under 35 U.S.C. § 371 of International Patent Application No. PCT/KR2022/020783, filed on Dec. 20, 2022, which in turn claims priority to Korean Patent Application No. 10-2022-0028476, filed on Mar. 7, 2022, the entire contents of which is incorporated herein for all purposes by this reference.

TECHNICAL FIELD

The present disclosure relates to an apparatus and a method for automatic assembly of a brake system and, more particularly, to an apparatus and a method for automatically assembling a pedal arm of a brake pedal and a push rod of a brake.

BACKGROUND ART

In general, vehicles are equipped with a brake system that is used to slow down or stop a moving vehicle.

The brake system of a vehicle typically includes a brake pedal that the driver operates with his or her foot, and a brake that receives force from the brake pedal and operates to generate braking force.

A brake pedal is located in the interior space of a vehicle and is rotatably mounted on a footrest panel under the driver's seat to facilitate easy operation by the driver.

Brake is a conceptual term that includes integrated electronic brake (IEB), and a brake is installed to be located in an engine room space based on a footrest panel.

A brake pedal and a brake are physically connected to each other by combining a pedal arm of the brake pedal and a clevis provided on a push rod of the brake. The pedal arm and the clevis of the push rod are integrally penetrated by a clevis pin, and a snap pin is coupled to the end of the clevis pin that penetrates to prevent the clevis pin from falling out.

The work of combining the clevis pin to connect the pedal arm and the push rod and coupling the snap pin to the clevis pin is all done manually by a worker. This conventional method has the disadvantage of reducing productivity as it takes a lot of work time, and work quality is not consistent. In particular, a small workspace means great inconvenience during work.

The description provided above as related art of the present disclosure is just for helping understand the background of the present disclosure and should not be construed as being included in the related art known by those skilled in the art.

An example of related art in this regard is Korean Patent Application Publication No. 10-2009-0057637.

DISCLOSURE

Technical Problem

The present disclosure is intended to solve the above problems occurring in the related art. An objective of the present disclosure is to provide an apparatus and a method for automatic assembly of a brake system, wherein the work of coupling a clevis pin and a snap pin to connect a pedal arm of a brake pedal to a clevis provided on a push rod of a brake is automated, thereby shortening work time and improving productivity and quality. Furthermore, quality-related information may be converted into data, and convenience of work may be improved.

Technical Solution

In order to achieve the above mentioned objectives, there is provided an apparatus for automatic assembly of a brake system, the apparatus including: a first robot provided with a first gripper for fixing a brake pedal, and configured to move the brake pedal fixed to the first gripper to a working position; and a second robot provided with a second gripper for fixing a clevis pin and a third gripper for fixing a snap pin, and configured to move the clevis pin and the snap pin fixed to the second gripper and the third gripper to the working position.

The first robot may be provided with a first vision sensor configured to scan the brake pedal loaded on the first gripper and to scan a location of a work site when the first robot moves to the work site.

The second gripper may be an electromagnetic gripper configured to prevent the clevis pin from coming off.

The third gripper may be provided with an inclined groove so as to grip and fix an inclined portion of the snap pin by means of the inclined groove.

The apparatus may further include: a motor fixed to the second robot; and a cylinder configured to move linearly by combining with a plunger that moves forward and backward when the motor is driven, wherein the third gripper may be coupled to a cylinder rod connected to the cylinder to enable straight movement The second robot may be equipped with a torque sensor configured to detect misassembly when assembling the clevis pin.

The apparatus may further include: a second vision sensor configured to scan whether a clevis provided on a push rod of a brake is in position when the clevis is loaded into the working position; and a rotary tool that is inserted into the clevis and is configured to rotate the push rod and the clevis to position the clevis in position.

The rotary tool may have a polygonal column shape and may be configured to rotate by receiving power.

A method for automatic assembly of the brake system according to the present disclosure includes: first loading of loading the brake pedal gripped by the first robot into the working position; second loading of loading the clevis pin and the snap pin gripped by the second robot to the working position; third loading of loading a clevis provided on a push rod of a brake to the working position; preparing for coupling to position a pedal arm of the brake pedal within the clevis in the working position; clevis pin coupling to move the clevis pin of the second robot so that the clevis pin penetrates the pedal arm and the clevis as one piece; and snap pin coupling to move the snap pin of the second robot so that the snap pin penetrates and is coupled to an end of the clevis pin that penetrates the pedal arm and the clevis.

The method may further include: clevis scanning of scanning an in-position state of the clevis by means of a second vision sensor after the clevis is loaded into the working position in the third loading, wherein when the clevis scanned by the second vision sensor is in position, the preparing for coupling may be immediately performed, whereas when the clevis scanned by the second vision sensor is not in position, first correcting may be performed to position the clevis in position by rotating the clevis using a rotary tool.

The in-position state of the clevis may be defined as a state in which the pedal arm is able to be inserted into the clevis loaded in the working position without interfering with the clevis.

In the clevis pin coupling, the clevis pin may simultaneously penetrate a first pin hole formed in the clevis and a second pin hole formed in the pedal arm.

When the clevis pin does pass through the second pin hole and hits the pedal arm because the first pin hole and the second pin hole do not match, a load may be transmitted to the clevis pin, and the load transmitted to the clevis pin may be detected by a torque sensor provided in the second robot, wherein an operation of the second robot may be stopped by a signal from the torque sensor, and a coupling operation of the clevis pin may be temporarily stopped, and in the state in which the coupling operation is paused, a position of the clevis loaded in the working position may be readjusted, and after the position of the clevis is readjusted, the coupling operation may be performed again to complete the clevis pin coupling.

When the position of the clevis is readjusted, a second vision sensor may scan the first pin hole and the second pin hole, and the position of the clevis may be readjusted until the first pin hole and the second pin hole match.

The method may further include: clevis pin scanning, before performing the snap pin coupling, of scanning a position of a third pin hole formed in the clevis pin using a second vision sensor,
- wherein when the third pin hole is aligned with a moving direction of the snap pin, the snap pin coupling may be immediately performed, whereas when the third pin hole is not aligned with the moving direction of the snap pin, second correcting may be performed to align the third pin hole and the moving direction of the snap pin by rotating the clevis pin by operating the second robot.

When the snap pin coupling is completed, the brake pedal may be separated from the first robot and at the same time, the clevis pin and the snap pin may be separated from the second robot to complete assembly, and after completion of the assembly, quality checking may be further performed to check a coupling state of the clevis pin and the snap pin.

Advantageous Effects

According to an apparatus and a method for automatic assembly of a brake system the present disclosure, the work of coupling a clevis pin and a snap pin to connect a pedal arm of a brake pedal to a clevis provided on a push rod of a brake is automated, thereby shortening work time and improving productivity and quality. Furthermore, quality-related information can be converted into data, and convenience of work can be improved.

MODE FOR INVENTION

Figure 1:
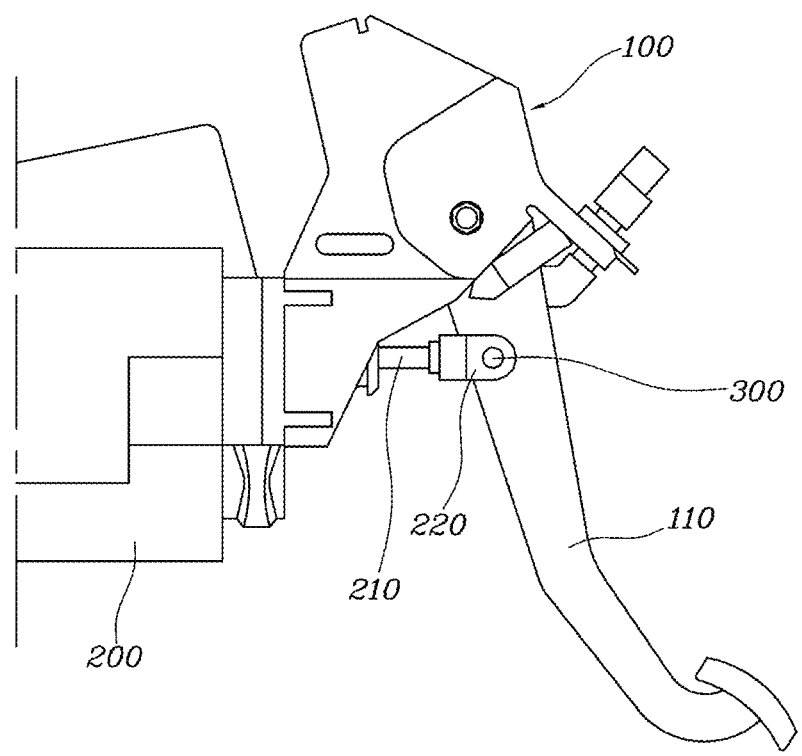
FIG. 1 is a side view of a brake system in which a clevis pin and a snap pin are automatically combined using a robot according to the present disclosure.

Hereafter, the embodiment of the present disclosure will be described in detail with reference to the accompanying drawings and the same or similar components are given the same reference numerals regardless of the numbers of figures and are not repeatedly described.

The terms "module" and "unit" that are used for components in the following description are given or used interchangeably only for the ease of writing the specification, and do not have distinct meanings or roles in themselves.

In the following description, if it is decided that the detailed description of known technologies related to the present disclosure makes the subject matter of the embodiment described herein unclear, the detailed description is omitted.

In addition, the accompanying drawings are provided only for easy understanding of the embodiment disclosed in the specification, and the technical spirit disclosed in the specification is not limited by the accompanying drawings, and all changes, equivalents, and replacements should be understood as being included in the spirit and scope of the present disclosure.

Terms including ordinal numbers such as "first", "second", etc. may be used to describe various components, but the components are not to be construed as being limited to the terms. The terms are used only to distinguish one component from another component.

It is to be understood that when one element is referred to as being "connected to" or "coupled to" another element, it may be connected directly to or coupled directly to another element or be connected to or coupled to another element, having the other element intervening therebetween.

On the other hand, it should be understood that when one element is referred to as being "connected directly to" or "coupled directly to" another element, it may be connected to or coupled to another element without the other element intervening therebetween.

Singular forms are intended to include plural forms unless the context clearly indicates otherwise.

It will be further understood that the terms "comprise (include)" or "have" used in this specification, specify the presence of stated features, steps, operations, components, parts, or a combination thereof, but do not preclude the presence or addition of one or more other features, numerals, steps, operations, components, parts, or a combination thereof.

In addition, the terms "unit" or "control unit" included in motor control unit (MCU), hybrid control unit (HCU), etc. are just widely used terms for naming controllers that control specific vehicle functions, and do not mean generic function units.

A controller may include a communication device that communicates with another controller or a sensor to control corresponding functions, a memory that stores an operating system or logic commands and input/output information, and one or more processors that perform determination, calculation, decision, etc. for controlling the corresponding functions.

Hereinafter, an apparatus and a method for automatic assembly of a brake system according to preferred embodiments of the present disclosure will be described with reference to the attached drawings.

With reference to FIGS. 1 to 12, an apparatus and a method for automatic assembly of a brake system, and series of processes according to the present disclosure will be described.

The apparatus for automatic assembly of a brake system according to the present disclosure is a device that automatically performs the work of combining a clevis pin 300 and a snap pin 400 to connect a pedal arm 110 of a brake pedal 100 to a clevis 220 provided on a push rod 210 of a brake 200.

Figure 2:
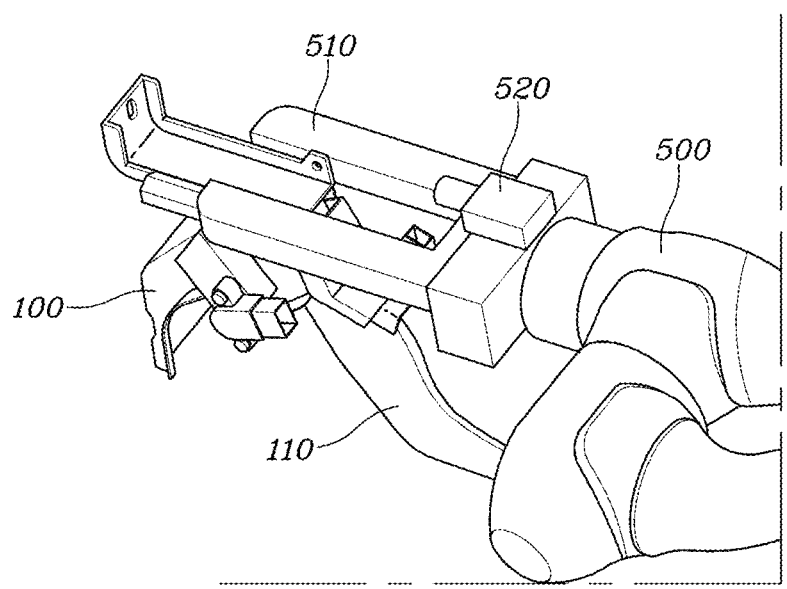
FIG. 2 is a view showing a state in which a brake pedal is gripped on a first robot according to the present disclosure.
Figure 3:
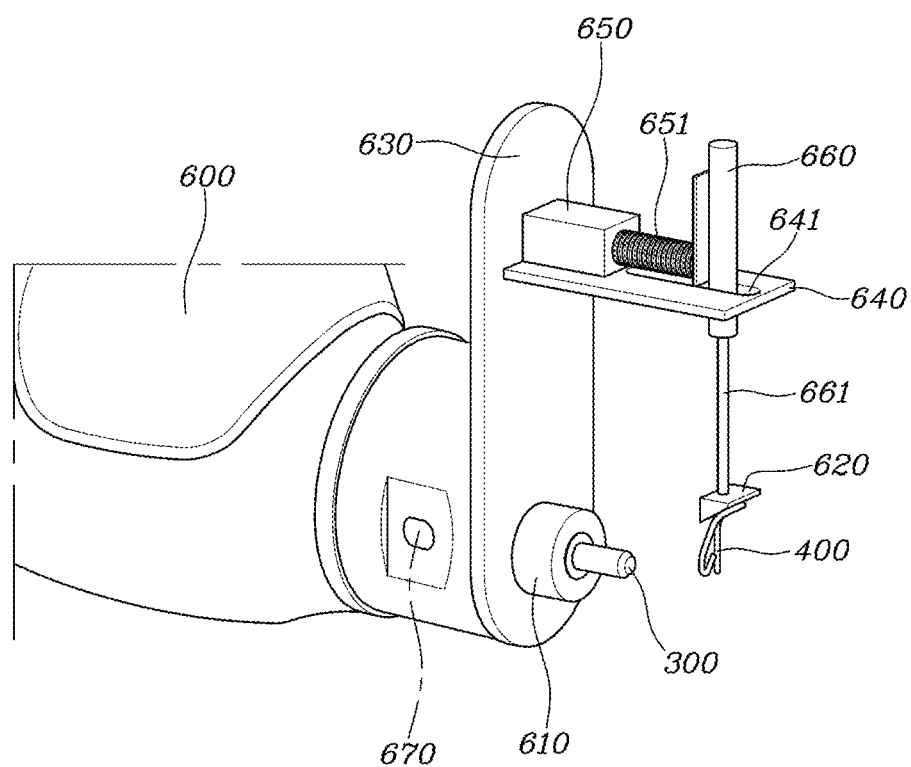
FIG. 3 is a view showing a state in which the clevis pin and the snap pin are gripped by a second robot according to the present disclosure.

FIG. 1 is a side view of a brake system in which the clevis pin 300 and the snap pin 400 are automatically combined using a robot according to the present disclosure, FIG. 2 is a view showing a state in which the brake pedal 100 is gripped on a first robot 500 according to the present disclosure, and FIG. 3 is a view showing a state in which the clevis pin 300 and the snap pin 400 are gripped by a second robot 600 according to the present disclosure.

The apparatus for automatic assembly of a brake system according to the present disclosure includes: the first robot 500 provided with a first gripper 510 for fixing the brake pedal 100, and configured to move the brake pedal 100 fixed to the first gripper 510 to a working position; and the second robot 600 provided with a second gripper 610 for fixing the clevis pin 300 and a third gripper 620 for fixing the snap pin 400, and configured to move the clevis pin 300 and the snap pin 400 fixed to the second gripper 610 and the third gripper 620 to the working position.

The first robot 500 and the second robot 600 may be 6-axis robot arms.

The first gripper 510 of the first robot 500 avoids the pedal arm 110 and grips the upper part of the brake pedal 100.

The first robot 500 is provided with a first vision sensor 520 that scans the brake pedal 100 loaded on the first gripper 510 and scans the location of a work site when the first robot 500 moves to the work site.

The first vision sensor 520 may be a 3D (three dimensions) vision sensor.

The second robot 600 is provided with the second gripper 610 that grips the clevis pin 300. The second gripper 610 is preferably an electromagnetic gripper that can prevent separation by maintaining a strong coupling force when engaging the clevis pin 300, but is not limited thereto.

The second gripper 610 may rotate while gripping the clevis pin 300.

Based on the state shown in FIG. 3, the second robot 600 is provided with a fixed first base 630 extending above the second gripper 610, and a second base 640 is fixed to one upper surface of the first base 630 so as to protrude in the same direction as the protruding direction of the clevis pin 300.

A servomotor 650 is fixed to one side of the upper surface of the second base 640, the servomotor 650 is equipped with a plunger 651 that moves forward and backward when the motor operates, a pneumatic cylinder 660 is coupled to the end of the plunger 651, the pneumatic cylinder 660 is provided with a cylinder rod 661 that moves up and down, and the third gripper 620 that grips the snap pin 400 is coupled to the end of the cylinder rod 661.

When the plunger 651 moves forward and backward due to the operation of the motor 650, the cylinder 660 coupled with the plunger 651 also moves linearly, and thus a guide hole 641 that guides the linear movement of the cylinder 660 is formed in the second base 640.

The cylinder rod 661 extends up and down through the guide hole 641 and moves up and down when the cylinder 600 is operated.

Figure 4:
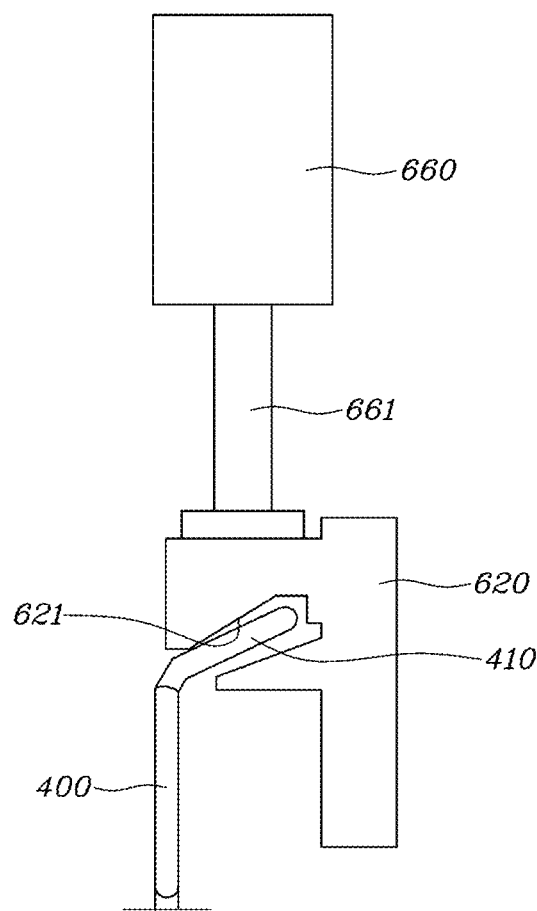
FIG. 4 is an enlarged view of an area where the snap pin is gripped by a third gripper shown in FIG. 3.

As shown in FIG. 4, one end of the snap pin 400 is formed as an inclined portion 410 at a predetermined angle, and an inclined groove 621 having an inclination matching the inclined portion 410 is formed in the third gripper 620. Accordingly, the third gripper 620 grips and fixes the inclined portion 410 of the snap pin 400 by means of the inclined groove 621.

The opposite side of the inclined portion 410 of the snap pin 400 is inserted into the clevis pin 300 and becomes a part coupled to the clevis pin 300.

The second robot 600 is equipped with a torque sensor 670 that detects misassembly when assembling the clevis pin 300.

The torque sensor 670 will be described again in the process of combining the clevis pin 300.

Figure 5:
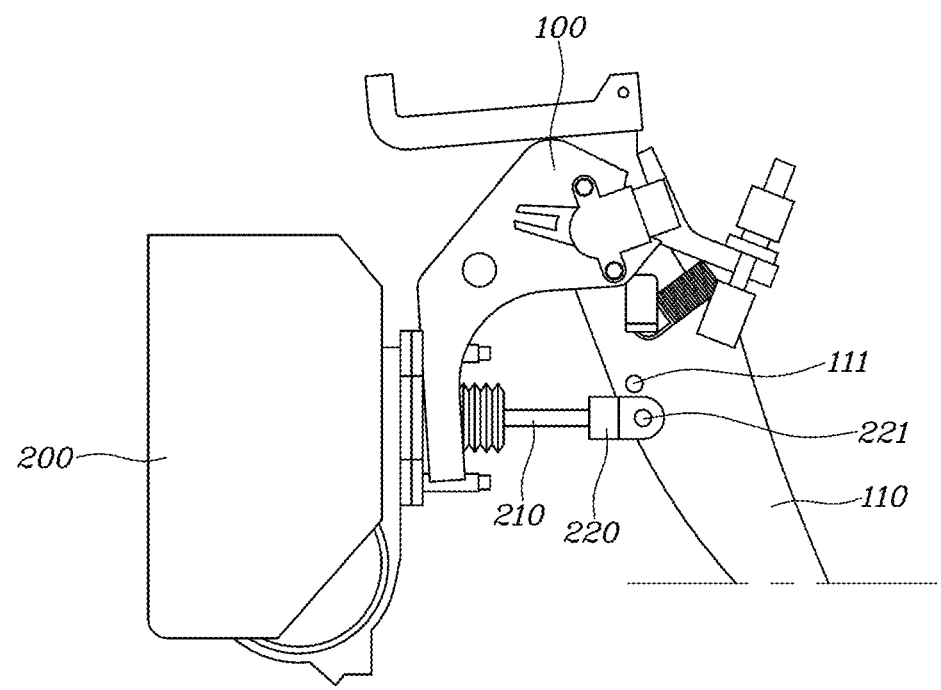
FIG. 5 is a view showing the brake pedal and a brake loaded to the working position.

The brake pedal 100 gripped by the first robot 500 is loaded into the work position for assembly due to the operation of the first robot 500, and the clevis pin 300 and the snap pin 400 gripped by the second robot 600 are also loaded into the working position due to the operation of the second robot 600. In addition, as the brake 200 moves to the working position, the clevis 220 of the push rod 210 is also loaded to the working position, resulting in a state as shown in FIG. 5.

Figure 6:
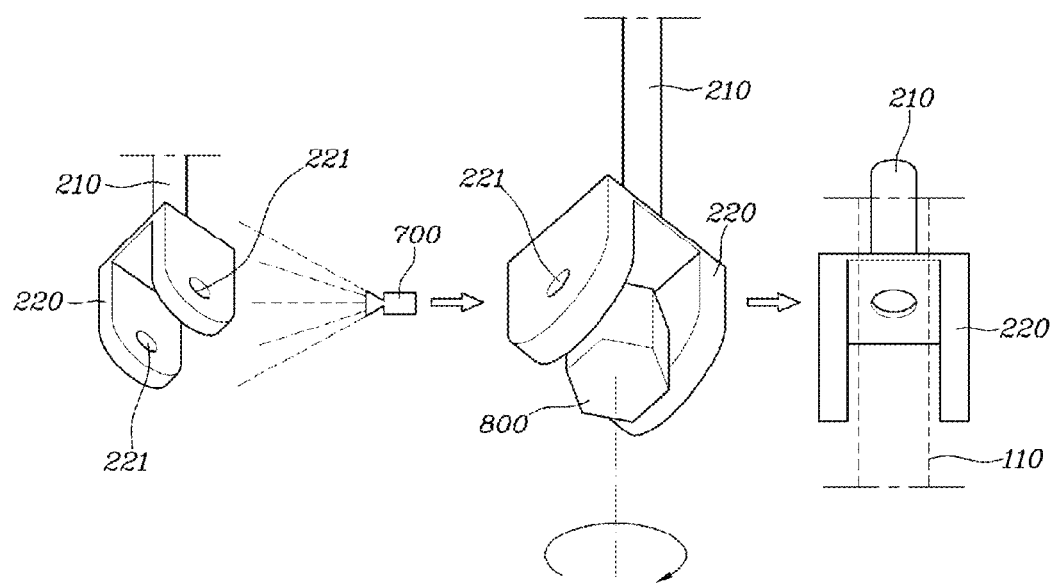
FIG. 6 is a view showing the process of correcting the position of a clevis loaded in the working position using a rotary tool.

Once the push rod 210 is loaded to the working position as the brake 200 moves to the working position, a second vision sensor 700 provided at the working position scans whether the clevis 220 is in position as shown in the left drawing of FIG. 6.

The second vision sensor 700 may also be a 3D vision sensor like the first vision sensor 520.

The in-position state of the clevis 220 may be defined as a state in which the pedal arm 110 may be inserted into the clevis 220 loaded in the working position without interfering with the clevis 220.

When the state of the clevis 220 scanned by the second vision sensor 700 is not in position, a rotary tool 800 according to the present disclosure is inserted into the clevis 220 as shown in the center drawing of FIG. 6, and by rotating the rotary tool 800, the push rod 210 and the clevis 220 are rotated and finally, a first correction is performed to position the clevis 220 in the in-position state as shown in the right drawing of FIG. 6.

The rotary tool 800 has a polygonal column shape and is configured to rotate by receiving power.

When the clevis 220 is in position, the pedal arm 110 of the brake pedal 100 loaded in the working position is inserted into the clevis 220 as shown in FIG. 5 and overlaps with the clevis 220.

Figure 7:
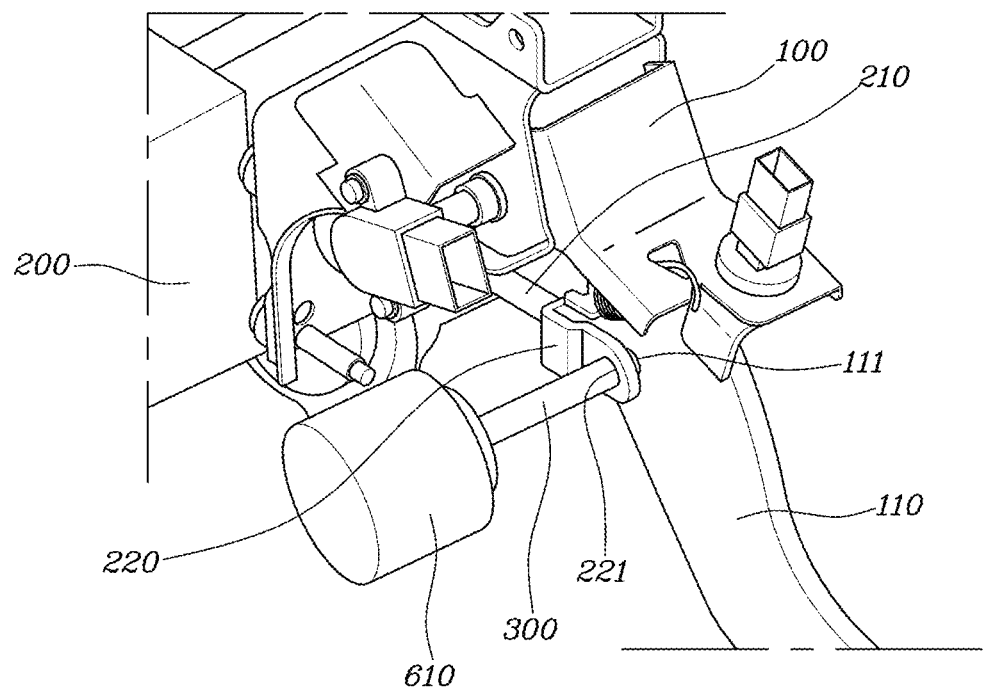
FIGS. 7 to 9 are views showing the operation of the clevis pin penetrating a pedal arm and the clevis as one piece.

After the pedal arm 110 of the brake pedal 100 is inserted into the clevis 220 in the working position, due to the operation of the second robot 600, the clevis pin 300 gripped by the second gripper 610 moves so that the clevis pin 300 penetrates the pedal arm 110 and the clevis 220 as one piece as shown in FIG. 7.

A second pin hole 111 is formed in the pedal arm 110 and a first pin hole 221 is formed in the clevis 220, and the clevis pin 300 simultaneously penetrates the first and second pin holes 221 and 111 by the operation of the second robot 600.

Figure 8:
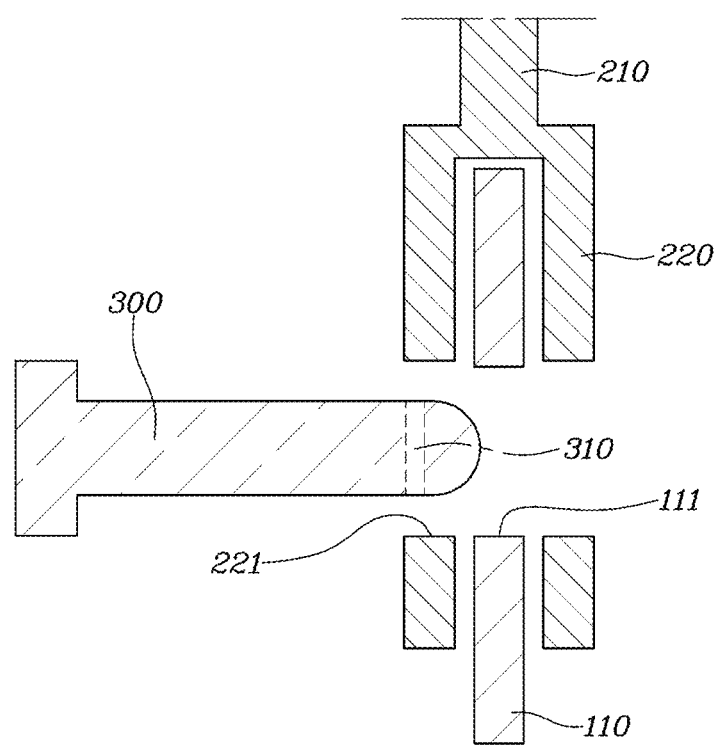

As shown in FIG. 8, in the case where the first pin hole 221 of the clevis 220 and the second pin hole 111 of the pedal arm 110 are aligned to be connected in a straight line with the pedal arm 110 inserted into the clevis 220, the clevis pin 300 passes smoothly without hitting the pedal arm 110 when the clevis pin 300 passes through the first and second pin holes 221 and 111. Thus, in this case, as no load is applied to the clevis pin 300, the torque sensor 670 provided in the second robot 600 does not operate.

Figure 9:
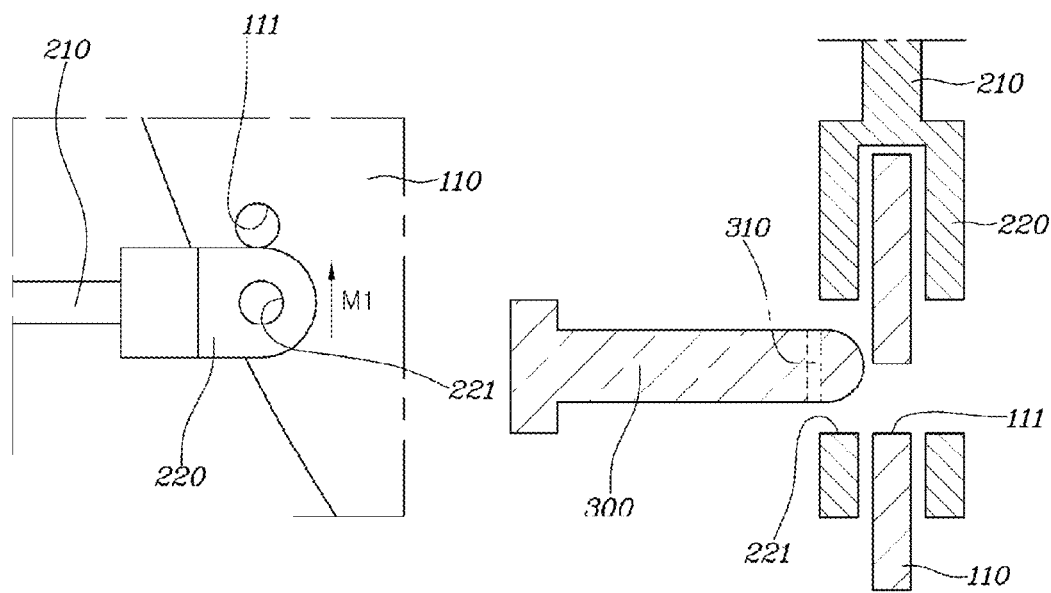

However, as shown in FIG. 9, in the case where the first pin hole 221 and the second pin hole 111 are not aligned in a straight line, the clevis pin 300 cannot pass through the second pin hole 111 and comes into contact with the pedal arm 110. In this case, the load due to contact with the pedal arm 110 is transmitted to the clevis pin 300, and the load transmitted to the clevis pin 300 is detected by the torque sensor 670 provided in the second robot 600.

The operation of the second robot 600 is stopped by a signal from the torque sensor 670, and the coupling operation of the clevis pin 300 is temporarily stopped, and in the state in which the coupling operation is paused, the position of the clevis 220 loaded in the working position is readjusted by moving upward (arrow M1). After the position of the clevis 220 is readjusted, the second robot 600 operates again to re-execute the coupling operation of the clevis pin 300, and thus the coupling of the clevis pin 300 is completed.

When the position of the clevis 220 is readjusted, the second vision sensor 700 scans the first pin hole 221 and the second pin hole 111, and the position of the clevis 220 is readjusted until the first pin hole 221 and the second pin hole 111 match.

Figure 10:
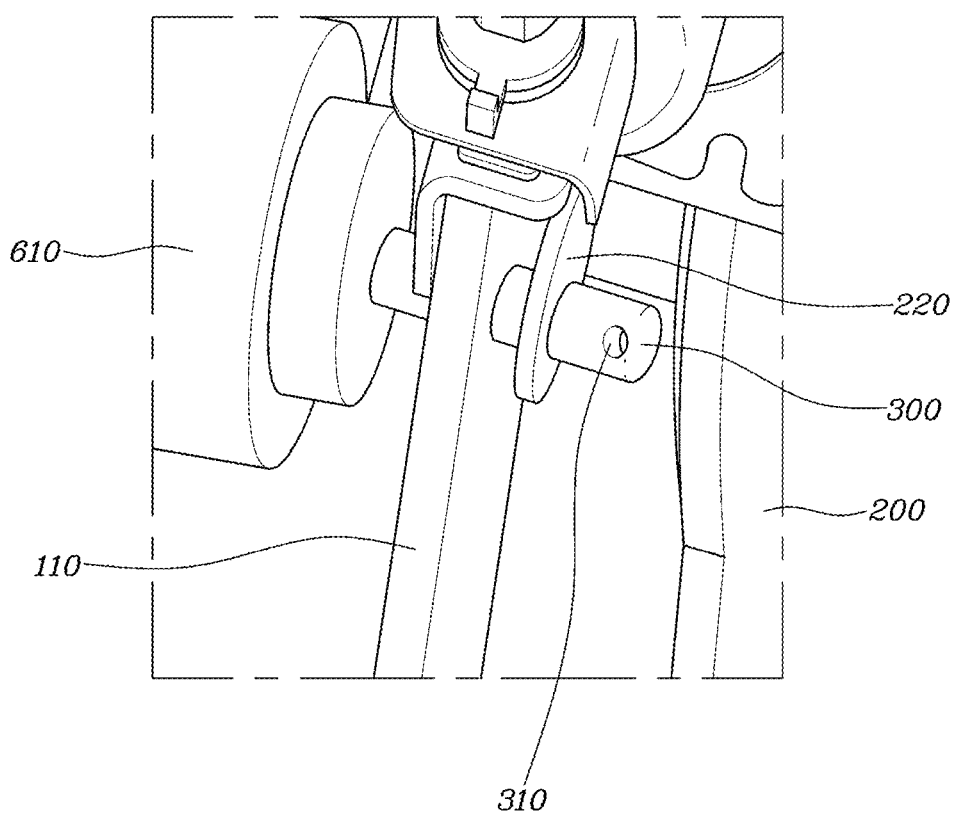
FIGS. 10 to 11 are views showing the operation of inserting the snap pin into a third pin hole of the clevis pin that penetrates the pedal arm and the clevis.

FIG. 10 is a view showing the state in which the clevis pin 300 penetrates the first pin hole 221 of the clevis 220 and the second pin hole 111 of the pedal arm 110.

Figure 11:
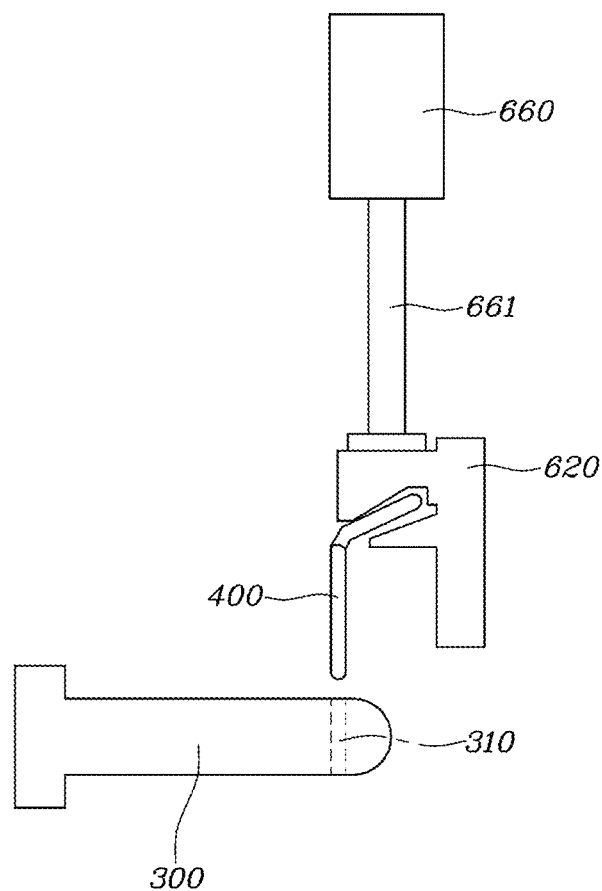

As shown in FIG. 10, after the clevis pin 300 penetrates the first and second pin holes 221 and 111, due to the operation of the second robot 600, the snap pin 400 gripped by the third gripper 620 moves and is inserted into the third pin hole 310 formed at the end of the clevis pin 300 as shown in FIG. 11.

Once the clevis pin 300 penetrates the first and second pin holes 221 and 111, the third pin hole 310 formed at the end of the clevis pin 300 is exposed to one side of the clevis 220. At this time, the second vision sensor 700 scans the position of the third pin hole 310 formed in the clevis pin 300.

If the third pin hole 310 scanned by the second vision sensor 700 is aligned with the moving direction of the snap pin 400 as shown in FIG. 11, due to the operation of the cylinder 660, the cylinder rod 661, the third gripper 620, and the snap pin 400 descend, and the descending snap pin 400 is inserted into the third pin hole 310 of the clevis pin 300 to complete assembly.

On the other hand, if the third pin hole 310 scanned by the second vision sensor 700 is not aligned with the moving direction of the snap pin 400, a second correction is performed to rotate the clevis pin 300 by the rotation of the second gripper 610 caused by the operation of the second robot 600 and finally align the third pin hole 310 and the moving direction of the snap pin 400 in a straight line. After completing the second correction, the snap pin 400 is inserted into the third pin hole 310 of the clevis pin 300 to complete assembly.

Once the assembly of the snap pin 400 is completed, the brake pedal 100 is separated from the first robot 500 and at the same time, the clevis pin 300 and the snap pin 400 are separated from the second robot 600. Consequently, the automatic assembly process according to the present disclosure is completed, and after completion of the assembly work, quality checking is performed to check the coupling state of the clevis pin 300 and the snap pin 400.

Figure 12:
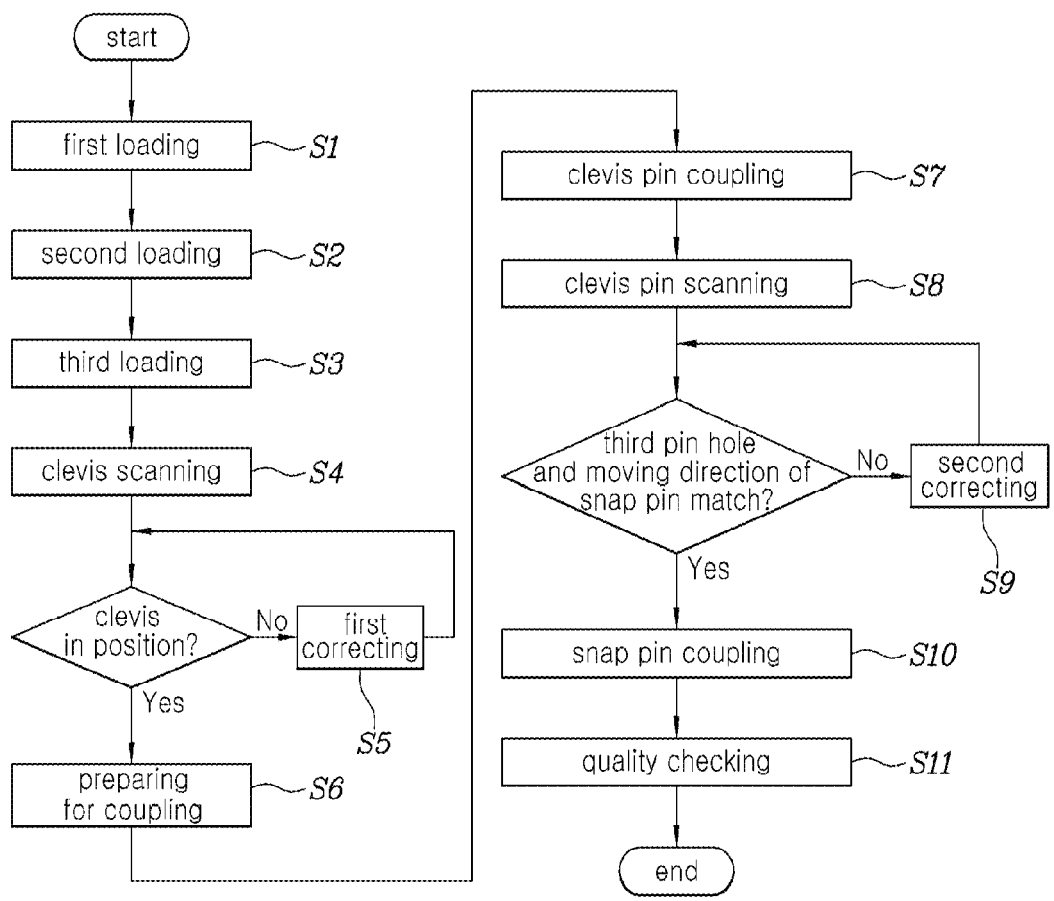
FIG. 12 is a schematic flowchart showing a method for automatic assembly of a brake system according to the present disclosure.

FIG. 12 is a schematic flowchart showing a method for automatic assembly of a brake system according to the present disclosure.

A method for automatic assembly of a brake system according to the present disclosure includes: first loading (step S1) of loading the brake pedal 100 gripped by the first robot 500 into the working position; second loading (step S2) of loading the clevis pin 300 and the snap pin 400 gripped by the second robot 600 to the working position; third loading (step S3) of loading the clevis 220 provided on the push rod 210 of the brake 200 to the working position; preparing for coupling (step S6) to position the pedal arm 110 of the brake pedal 100 within the clevis 220 in the working position; clevis pin coupling (step S7) to move the clevis pin 400 of the second robot 600 so that the clevis pin 400 penetrates the pedal arm 110 and the clevis 220 as one piece; and snap pin coupling (step S10) to move the snap pin 400 of the second robot 600 so that the snap pin 400 penetrates and is coupled to the end of the clevis pin 300 that penetrates the pedal arm 110 and the clevis 220.

After the clevis 220 is loaded into the working position in the third loading (step S3), clevis scanning (step S4) of scanning the in-position state of the clevis 220 by means of the second vision sensor 700 is further included.

When the clevis 220 scanned by the second vision sensor 700 is in position, the preparing for coupling (step S6) is immediately performed. When the clevis 220 scanned by the second vision sensor 700 is not in position, first correcting (step S5) is performed to position the clevis 220 in the in-position state by rotating the clevis 220 using the rotary tool 800.

After performing the clevis pin coupling (step S7) and before performing the snap pin coupling (step S10), clevis pin scanning (step S8) of scanning the position of the third pin hole 310 formed in the clevis pin 300 using the second vision sensor 700 is further included.

When the third pin hole 310 scanned by the second vision sensor 700 is aligned with the moving direction of the snap pin 400, the snap pin coupling (step S10) is immediately performed. When the third pin hole 310 scanned by the second vision sensor 700 is not aligned with the moving direction of the snap pin 400, second correcting (step S9) is performed to align the third pin hole 310 and the moving direction of the snap pin 400 by rotating the clevis pin 300 by operating the second robot 600.

Once the snap pin coupling (step S10) is completed, the brake pedal 100 is separated from the first robot 500 and at the same time, the clevis pin 300 and the snap pin 400 are separated from the second robot 600 to complete assembly. After completion of the assembly work, quality checking is further performed to check the coupling state of the clevis pin 300 and the snap pin 400.

As described above, according to the apparatus and the method for automatic assembly of a brake system of the present disclosure, the work of coupling the clevis pin 300 and the snap pin 400 to connect the pedal arm 110 of the brake pedal 100 to the clevis 220 provided on the push rod 210 of the brake 200 is automated, thereby Shortening work time and improving productivity and quality. Furthermore, quality-related information may be converted into data, and convenience of work may be improved.

Although the present disclosure was provided above in relation to specific embodiments shown in the drawings, it is apparent to those skilled in the art that the present disclosure may be changed and modified in various ways without departing from the scope of the present disclosure, which is provided in the following claims.

The invention claimed is:

1. An apparatus for automatic assembly of a brake system, the apparatus comprising:
    a first robot provided with a first gripper for fixing a brake pedal, and configured to move the brake pedal fixed to the first gripper to a working position; and
    a second robot provided with a second gripper for fixing a clevis pin and a third gripper for fixing a snap pin, and configured to move the clevis pin and the snap pin fixed to the second gripper and the third gripper to the working position,
    wherein the third gripper is provided with an inclined groove so as to grip and fix an inclined portion of the snap pin by using the inclined groove.

2. The apparatus of claim 1, wherein the first robot is provided with a first vision sensor configured to scan the brake pedal loaded on the first gripper and to scan a location of a work site when the first robot moves to the work site.

3. The apparatus of claim 1, wherein the second gripper is an electromagnetic gripper configured to prevent the clevis pin from coming off.

4. The apparatus of claim 1, wherein the second robot is equipped with a torque sensor configured to detect misassembly when assembling the clevis pin.

5. The apparatus of claim 1, further comprising:
    a second vision sensor configured to scan whether a clevis provided on a push rod of a brake is in position when the clevis is loaded into the working position; and
    a rotary tool that is inserted into the clevis and is configured to rotate the push rod and the clevis to position the clevis in position.

6. The apparatus of claim 5, wherein the rotary tool has a polygonal column shape and is configured to rotate by receiving power.

7. An apparatus for automatic assembly of a brake system, the apparatus comprising:
    a first robot provided with a first gripper for fixing a brake pedal, and configured to move the brake pedal fixed to the first gripper to a working position;
    a second robot provided with a second gripper for fixing a clevis pin and a third gripper for fixing a snap pin, and configured to move the clevis pin and the snap pin fixed to the second gripper and the third gripper to the working position;
    a motor fixed to the second robot; and
    a cylinder configured to move linearly by combining with a plunger that moves forward and backward when the motor is driven,
    wherein the third gripper is coupled to a cylinder rod connected to the cylinder to enable straight movement.

8. A method for automatic assembly of a brake system by using an apparatus for automatic assembly of the brake system, the apparatus including: a first robot provided with a first gripper for fixing a brake pedal, and configured to move the brake pedal fixed to the first gripper to a working position, and a second robot provided with a second gripper for fixing a clevis pin and a third gripper for fixing a snap pin, and configured to move the clevis pin and the snap pin fixed to the second gripper and the third gripper to the working position, the method comprising:
    first loading of loading the brake pedal gripped by the first robot into the working position;
    second loading of loading the clevis pin and the snap pin gripped by the second robot to the working position;
    third loading of loading a clevis provided on a push rod of a brake to the working position;
    preparing for coupling to position a pedal arm of the brake pedal within the clevis in the working position;
    clevis pin coupling to move the clevis pin of the second robot so that the clevis pin penetrates the pedal arm and the clevis as one piece; and
    snap pin coupling to move the snap pin of the second robot so that the snap pin penetrates and is coupled to an end of the clevis pin that penetrates the pedal arm and the clevis.

9. The method of claim 8, further comprising:
    clevis scanning of scanning an in-position state of the clevis by using of a second vision sensor after the clevis is loaded into the working position in the third loading,
    wherein when the clevis scanned by the second vision sensor is in position, the preparing for coupling is immediately performed, whereas when the clevis scanned by the second vision sensor is not in position, first correcting is performed to position the clevis in position by rotating the clevis using a rotary tool.

10. The method of claim 9, wherein the in-position state of the clevis is defined as a state in which the pedal arm is able to be inserted into the clevis loaded in the working position without interfering with the clevis.

11. The method of claim 8, wherein in the clevis pin coupling, the clevis pin simultaneously penetrates a first pin hole formed in the clevis and a second pin hole formed in the pedal arm.

12. The method of claim 11, wherein when the clevis pin does pass through the second pin hole and hits the pedal arm because the first pin hole and the second pin hole do not match, a load is transmitted to the clevis pin, and the load transmitted to the clevis pin is detected by a torque sensor provided in the second robot, wherein an operation of the second robot is stopped by a signal from the torque sensor, and a coupling operation of the clevis pin is temporarily stopped, and in the state in which the coupling operation is paused, a position of the clevis loaded in the working position is readjusted, and after the position of the clevis is readjusted, the coupling operation is performed again to complete the clevis pin coupling.

13. The method of claim 12, wherein when the position of the clevis is readjusted, a second vision sensor scans the first pin hole and the second pin hole, and the position of the clevis is readjusted until the first pin hole and the second pin hole match.

14. The method of claim 8, further comprising:
    clevis pin scanning, before performing the snap pin coupling, of scanning a position of a third pin hole formed in the clevis pin using a second vision sensor,
    wherein when the third pin hole is aligned with a moving direction of the snap pin, the snap pin coupling is immediately performed, whereas when the third pin hole is not aligned with the moving direction of the snap pin, second correcting is performed to align the third pin hole and the moving direction of the snap pin by rotating the clevis pin by operating the second robot.

15. The method of claim 8, wherein when the snap pin coupling is completed, the brake pedal is separated from the first robot and at the same time, the clevis pin and the snap pin are separated from the second robot to complete assembly, and after completion of the assembly, quality checking is further performed to check a coupling state of the clevis pin and the snap pin.

\* \* \* \* \*